United States Patent
Shirriff (10) Patent No.: US 7,325,202 B2
(45) Date of Patent: Jan. 29, 2008

(54) METHOD AND SYSTEM FOR SELECTIVELY RETRIEVING UPDATED INFORMATION FROM ONE OR MORE WEBSITES

(75) Inventor: Kenneth Shirriff, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 857 days.

(21) Appl. No.: 10/404,530

(22) Filed: Mar. 31, 2003

(65) Prior Publication Data

US 2004/0189696 A1 Sep. 30, 2004

(51) Int. Cl.
G06F 3/00 (2006.01)
(52) U.S. Cl. ...................................................... 715/742
(58) Field of Classification Search ................. 715/742
See application file for complete search history.

(56) References Cited

U.S. PATENT DOCUMENTS

| | | | |
|---|---|---|---|
| 5,813,007 A * | 9/1998 | Nielsen | 707/10 |
| 6,421,726 B1 * | 7/2002 | Kenner et al. | 709/225 |
| 6,516,349 B1 * | 2/2003 | Lieberman | 709/225 |
| 6,959,319 B1 * | 10/2005 | Huang et al. | 709/203 |
| 7,089,305 B2 * | 8/2006 | Bates et al. | 709/224 |
| 2003/0206554 A1 * | 11/2003 | Dillon | 370/432 |
| 2004/0098451 A1 * | 5/2004 | Mayo | 709/203 |
| 2004/0216036 A1 * | 10/2004 | Chu et al. | 715/501.1 |

* cited by examiner

*Primary Examiner*—Kristine Kincaid
*Assistant Examiner*—Lê Nguyen
(74) *Attorney, Agent, or Firm*—Bobby K. Truong; Hickman Palermo Truong & Becker LLP (57) ABSTRACT

A computer system having a user specified web browsing system for selectively retrieving content from a variety of web sites is disclosed. The web browser of the present invention is configured to track multiple web sites at any given time to determine content updates in these web sites. In one embodiment of the present invention, the web browser automatically periodically checks user specified web sites, detects changes to content at these web sites, filters out unimportant changes and delivers a summary of the changes to the user.

20 Claims, 8 Drawing Sheets

| CNN.COM | | | | | | PAGE 1 OF 2 |
|---|---|---|---|---|---|---|
| N NETSCAPE | ✉ MAIL | 🗓 CALENDAR | 👤 IM | 🔍 SEARCH | ➤ | HOLIDAY GIFTS: |

WELCOME!
CNN.COM.  EDITIONS: EUROPE | ASIA

| BUSINESS LONG DISTANCE & TOLL-FREE | 4.9¢ A MINUTE |
|---|---|

SEARCH | GO     UPDATED: 03:23 p.m. EST (2023 GMT) -- 24 DECEMBER 2001 — 465      /440

MAIN PAGE
WORLD
U.S.
WEATHER
BUSINESS
SPORTS
POLITICS
LAW
SCI-TECH
SPACE
HEALTH
ENTERTAINMENT
TRAVEL
EDUCATION
CAREER
IN-DEPTH

CN STORE
HASSLE-FREE
HOLIDAYS

QUICK NEWS
LOCAL
COMMUNITY
MULTIMEDIA
E-MAIL SERVICES
CNNTOGO
ABOUT US

CNN TV
WHAT'S ON
SHOW
TRANSCRIPTS
CNN HEADLINE
NEWS
CNN
INTERNATIONAL
ASKCNN
↗
450

EDITIONS
CNN.COM ASIA
CNN.COM EUROPE
CNNENESPANOL.COM
SET YOUR EDITION
LANGUAGES ▽

WAR AGAINST TERROR

(PICTURE)   (AP PHOTO)

MARINES EXAMINE A
MARKSMAN'S RIFLE AT THEIR
BASE NEAR KANDAHAR

MARINES TO JOIN BIN LADEN HUNT
↖480

• MILITARY OFFICIALS: MARINES' MOVE INTO MOUNTAINS IS "IMMINENT"
• OFFICIAL: WEEKEND AIRSTRIKE TARGETED CAVES, AMMO DUMPS NORTH OF KANDAHAR
• INTERIM AFGHAN LEADER KARZAI NAMES N. ALLIANCE GEN. DOSTUM TO DEFENSE POST
• OFFICALS SAY RICHARD REID HAD EXPLOSIVES HIDDEN IN HIS SHOES

FULL STORY »

PASSENGERS DESCRIBE IN-FLIGHT STRUGGLE
FRENCH INVESTIGATE SECURITY LAPSE
ON THE SCENE: REACTION AT LOGAN
CNN ACCESS: WEIGHING AIRPORT SECURITY
IN-DEPT: FLIGHT RISK | MESSAGE BOARD
TALKBACK LIVE: CHAT | AIM
  ON THE
  SCENE                                    MORE »
HARRIS WHITBECK: DOSTUM'S APPOINTMENT
WOLF BLITZER: INTERVIEW WITH KARZAI
MAP: GO ON THE SCENE WITH CNN

| PALM OS ® SOFTWARE |
|---|
↖460

WEATHER
FIVE-DAY FOR
10,000 CITIES
U.S. ZIP

METHOD AND SYSTEM FOR SELECTIVELY RETRIEVING UPDATED INFORMATION FROM ONE OR MORE WEBSITES

FIELD OF THE INVENTION

The present claimed invention relates generally to the field of information processing systems. More particularly, embodiments of the present claimed invention relates to web-based content selection and retrieval in a browser environment.

BACKGROUND ART

The World Wide Web (the "web") provides a popular source of information for consumers and business users. Surfing the web has become appealing to both sophisticated and casual users. The web browser has therefore become the primary means of accessing data over the Internet. However, one of the major problems is that the user must go out and search for data. If there are 20 web sites a user is interested in, the user must look at each site to see if there have been any interesting changes since the user's last visit. Even then, if additional content is added to the site after the visit, the user will not find out until the user returns to the site again.

Figure 1:
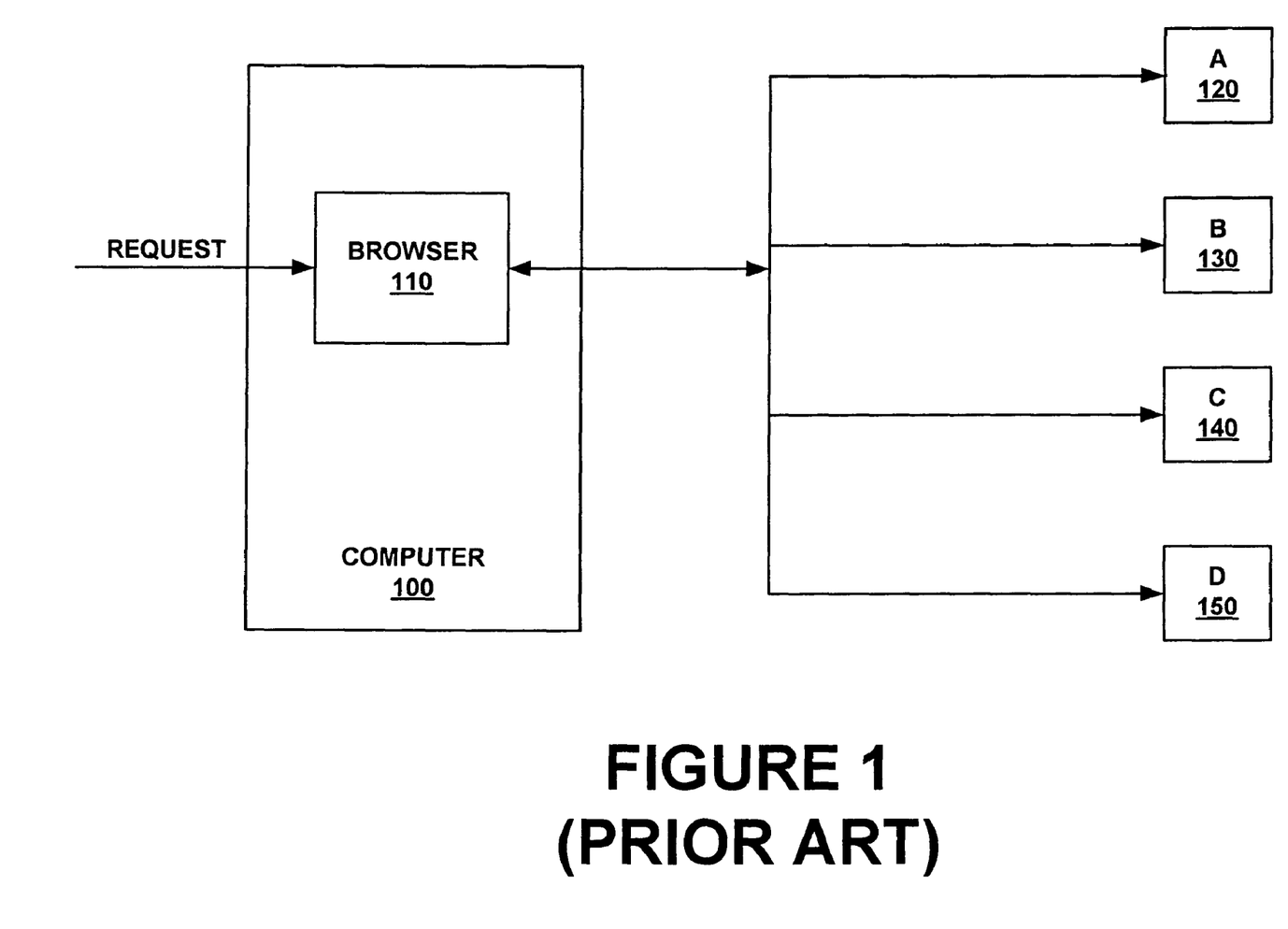
FIG. 1 is a block diagram of a conventional Internet browser system.

FIG. 1 is a block diagram illustration of a typical browser configuration in the prior art. In the illustration in FIG. 1, a user typically, accesses web sites 120-150 via web browser 110. In FIG. 1, the user can access web site 120-150 by accessing each individual web site to access the data the user desires. When the content at each web site is updated, the user has no way of automatically knowing the change in content until the user revisits the site.

This poses a problem for several classes of web sites. If a site is infrequently updated, the user will need to visit the site many fruitless times until the user actually notices a change. In practice, the user is unlikely to keep checking the site, and may miss changes that occur in the site.

If the site is frequently updated, for example a news site, the user may need to visit the site very often to see the most recent content. This will become unmanageable if there are many sites that the user is interested in, since the user will spend a great deal of time going from site to site.

Many sites are updated frequently, but the updates may be unimportant to the user. For instance, a banner advertisement may change frequently, or a date stamp on the page may change every day, or even every visit, but the actual content of the page may not have changed. These types of pages are a problem for simplistic systems for finding modified pages.

Thus, if a user is interested in multiple, changing sites, the user will either need to spend a great deal of time repeatedly visiting a web site, or the user will fail to see the current information he/she wants.

Several prior art solutions have been provided. The first is a list of book-marked web pages of interest. The user can request the browser to determine if any of the book-marked pages have changed since the last visit. This is useful for rarely-modified pages, but does not, however, help with pages that change often, or pages that have irrelevant changes. This solution also requires that the user provide a specific list of pages.

Another solution is for the web site to provide an email signup, which will send an email message whenever there is a relevant change on the web page. For instance, a page rarely updated can send out an email whenever there is a change or a news page can send out an email whenever there is breaking news. The main disadvantage of this solution is that it must be implemented by the web site providing the pages, so the user is helped only on the relatively small set of sites that implement this solution. Additionally, the notification proposed by this solution is under the control of the web site, not the user, so the user cannot fine-tune the notification. Finally, notification is through email, so the user needs to read their email and then switch to a web browser to access the page.

Another solution is "channels," as implemented in Internet Explorer. This allows the user to subscribe to a web site as a "channel." The content of the web page is periodically accessed and optionally downloaded to the user's computer. A particular channel can be selected for viewing by clicking on the "channel bar." The contents of the web page can also be constantly displayed in a separate window or a screen saver. This solution permits constant display of frequently updated data, but is unwieldy for more than a few channels, since each channel is displayed separately. In addition, when the contents of a channel change, the browser cannot distinguish between relevant and irrelevant changes.

Another prior art solution is a "start page," which is a web page provided by a company that summarizes current information. Examples of this are used by Yahoo and Excite. These pages allow a user to personalize the page with selected news, stocks, weather, sports, etc. This type of site solves part of the problem by combining multiple types of current information in a single place. These sites, however, have the disadvantage that the information provided is under the control of the site and is limited to a small set of content providers. For instance, they may get news from one or a few sources. If the user wants to see summarized news from a different source, the "start page" solution will not provide it.

Another solution combines content providers that provide summarized information with a viewer that displays the desired summaries. The content may be provided through different "channels," and the user can select the desired channels of content. An example of this is "Headline Viewer" available by http://www.vertexdev.com/HeadlineViewer/. The disadvantage of this approach is that it can only handle content that has been specially processed by a content provider, thereby limiting the types of data that can be tracked.

Thus, for the prior art user to view content from multiple web sites, the user needs to painstakingly and manually access specific content from each web site to retrieve the content desired.

SUMMARY OF INVENTION

Accordingly, to take advantage of the myriad of web-sites and content on the Internet and the numerous and continuous updates of content in these web sites, a system and method with extensible capabilities to allow updated and continuous content selection to be automatically delivered to users of these web sites are needed. A need exists for "out-of-the-box" web content delivery system solutions to allow technically unsophisticated end-users to connect to the Internet environment and have content continuously delivered to them without unduly tasking the end-user's technical abilities.

Embodiments of the present invention are directed to a system and a method for consolidating updated web content selection and presentation in a computer network environment. In general, embodiments of the present invention vary the degree of providing web content to a user connecting to the web environment by implementing user specified content selection and presentation to retrieve content that is based on predetermined user requirements. In other words, one embodiment of the invention provides user specific content selection and retrieval in an Internet browser environment.

Embodiments of the invention also include an Internet browser that is user programmed to dynamically and automatically retrieve updated content from specified web sites for delivery to the user. The browser periodically queries web pages at different web sites according to a user defined configuration file to retrieve content from these web sites. The Internet browser detects changes and summarizes these changes for delivery to the user. The browser includes page formatting logic that formats consolidated content gathered from the various web sites and delivers the content in the form of a web page to the user. The delivered summary web page may be similar in appearance to a commercial "start page," except the page is under the control of the user and can retrieve content from any source. An embodiment of the present invention provides page monitoring capabilities to monitor pages accessed by the user and uses this information to modify both pages tracked and displayed to the user. Content is retrieved from the specified web sites on a continuous basis in order to provide the user with updated content from the specified web sites.

Embodiments of the present invention also include a display module that takes summarized data retrieved from the specified web sites and displays it as a web page in a user-configurable format. The display module of the present invention may be implemented as a component that plugs into an existing browser, is a standalone user interface, or is a proxy that sits between the browser and the network.

Embodiments of the present invention further include a content data collection module. The data collection module includes a configuration file that specifies a set of pages and a desired frequency of updating the pages. At the desired frequency, the data collection module accesses the specified page. The accessed page is compared with the previously accessed version, either through a timestamp or a checksum to determine if there have been any changes to the page. If there are any changes, the page is processed in more detail.

Embodiments of the present invention further include a request monitoring module for tracking a user's access to web pages. The monitoring module allows the present invention to determine which items to delete from the client content selection logic that allows the service provider to pre-determine the type of content that is made available to a particular client. Content selection is based on user defined content type, the frequency at which said content may be retrieved and whether the user is a casual or advanced user of the content retrieved from the various web sites.

Embodiments of the present invention further include content availability logic that dynamically configures the updated content retrieved from the various web sites and formatting the retrieved data in a format suitable for delivery to the user. In one embodiment of the present invention, content retrieved from various user defined web sites is filtered to remove unimportant information, such as banner ads, menus, etc., before being delivered to the user.

Embodiments of the present invention further include content retrieval frequency reconciler. The frequency reconciler reconciles the frequency at which the user wishes updated content from the various web sites to be delivered with the real time content updated frequency at the selected web sites.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The invention is directed to a system, an architecture, subsystem and method to manage user content selection in a device independent browser environment in a way superior to the prior art. In accordance with an aspect of the invention, a computer system provides content selection and presentation which enables user specified web sites to be scoured in determining the type of content to present to the user.

In the following detailed description of the present invention, a system and method for an Internet protocol based communication system are described.

The invention can be more fully described with reference to FIGS. 2 through 6.

Figure 2:
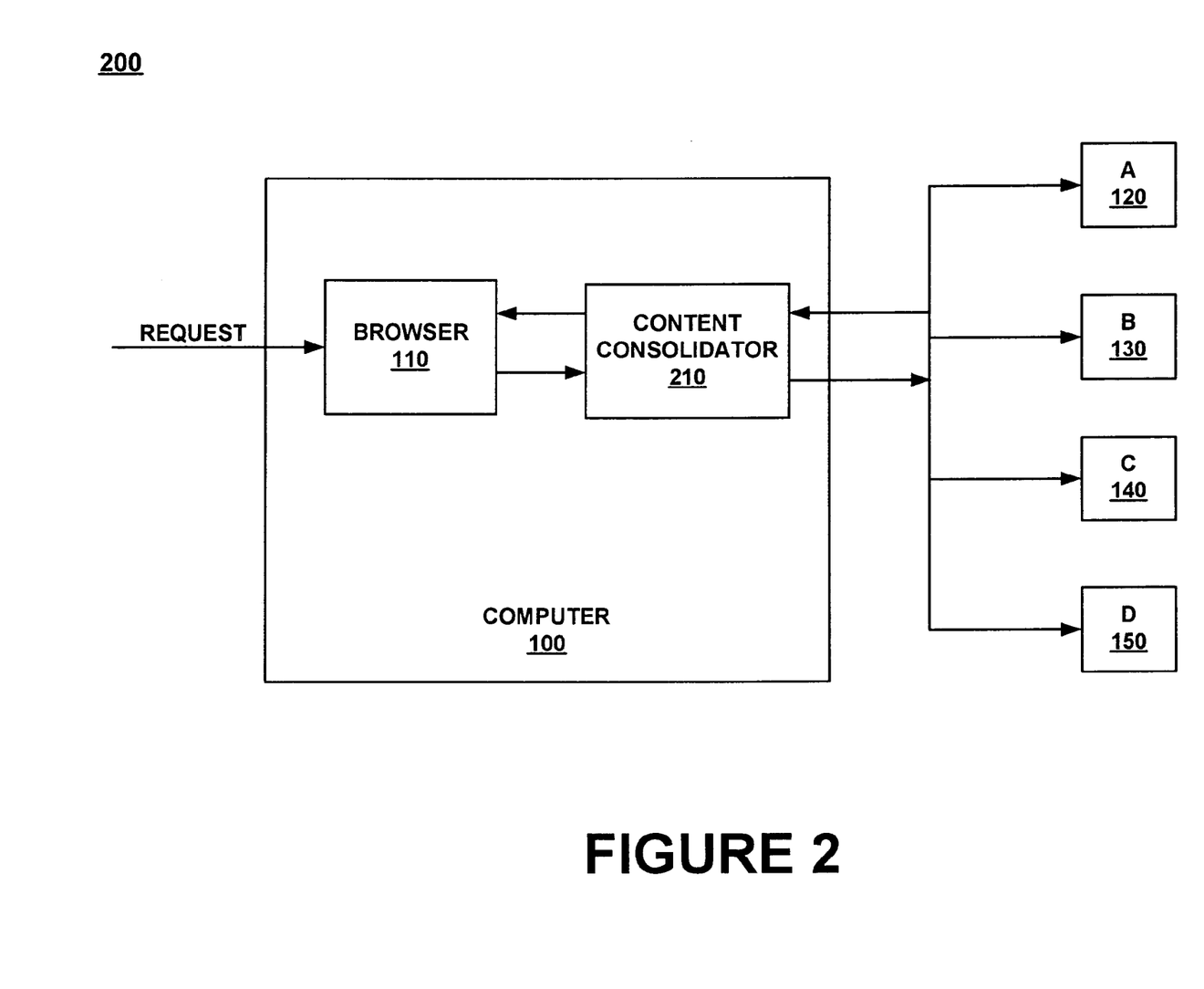
FIG. 2 is a block diagram of an embodiment of the present invention.

FIG. 2 is a block diagram depiction of one embodiment of the Internet browsing environment of the present invention.

As shown in FIG. 2, the Internet browsing environment 200 of the present invention comprises computer system 100 having a browser 110, a browser consolidator 210 and web sites 120-150. In the web browser environment shown in FIG. 2, the browser consolidator 210 functions as a proxy to the browser 110 in computer system 100 to provide consolidator updated content periodically retrieved from web sites 120-150 specified by the user.

The browser consolidator 210 includes components that periodically query web pages 120-150 according to a user defined configuration file. The browser consolidator 210 detects changes (updates) in the specified web sites and summarizes those changes in a format similar to a web page and delivers it to the user. In one embodiment of the present invention, the web page presented by the browser consolidator 210 may be similar in appearance to a commercial "start page," except the page is typically under the control of the user and can get content from any specified source. The browser 210 also includes logic to monitor pages accessed from the various web sites 120-150 and uses the information to modify both the pages tracked and the displayed pages with changes. The browser consolidator 210 further includes logic for importing desired content from any content provider that supplies content to the desired web sites 120-150.

Figure 3:
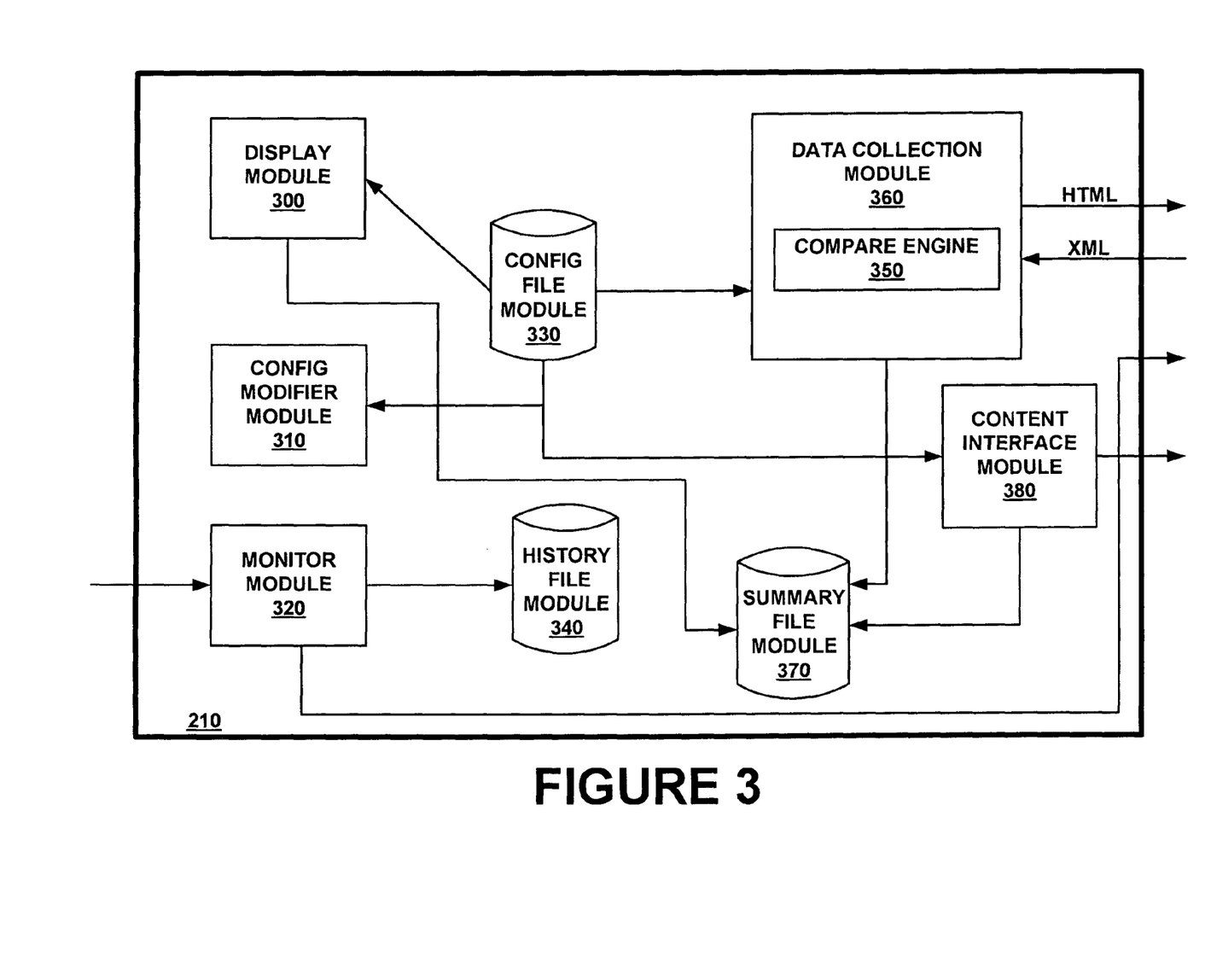
FIG. 3 is a block diagram of an exemplary internal architecture of the browsing consolidator of the present invention.

FIG. 3 is a block diagram illustration of one embodiment of the browser consolidator 210 of the present invention. Browser consolidator 210 comprises display module 300, configuration modifier module 310, monitor module 320, configuration file module 330, history file module 340, data collection module 360, summary file module 350 and content interface module 380. The browser 210 also couples to web sites 120-150 (FIG. 2) to retrieve content requested by the user connecting to the browser 210.

The data collection module 360 is coupled to the configuration file module 330 to provide a configuration file that specifies a set of pages and a desired frequency of updating those pages. At the desired frequency, the data collection module 360 will access the identified page(s). The accessed page(s) is compared with the previously accessed version, either through a time-stamp or a checksum. If the page has not changed, no processing needs to be done. If there are changes, the page is processed in more detail.

In one embodiment of the present invention, the detailed processing of an updated page entails condensing the page down to a collection of relevant data. In one embodiment of the present invention, the condensation of a page may be achieved by using heuristics and/or user-specified configuration information. Typically, the page is broken down into high-level formatting elements, such as table columns and table cells.

Heuristics may be used to eliminate ads, banners at the top and bottom of the page and menus. The remaining data may be broken into individual items based on rules such as "a paragraph with one link will become an item" or "a page of text will have the first paragraph selected as a summary item," or "a table of numbers (e.g., stock prices) will be selected as a summary item."

The condensed data can be stored in a variety of ways. In one embodiment of the present invention, the condensed data may be stored in an XML data format. The data record can hold, for instance: a title; a link to the original page; a text summary; the creation date of this entry; and information on the user's interaction with this entry.

Accessing a specified page has a few complexities. First, the specified page may be a frame, which includes sub-pages. These sub-pages should also be checked, since the sub-pages are what actually appear to the user.

A second issue is that the user may wish to examine more than a single page. For instance, they may wish to track all the pages to which a particular page has links. The user may also wish to track the contents of a particular changing link on a page. For example, a page may have a link "Current Stories" that links to a page of stories the user wishes to track. If the link is constant, the user can just add the contents of that link to their list of pages to track, but if the link changes (e.g., it contains the date), the data collection module 360 accesses the first page, finds the appropriate link, follows that link, and then analyzes the resulting page. Thus, the data collection module 360 is configurable to handle this type of multi-step link.

In another embodiment of the data collection module 360, the data collection module 350 may access user-specific data, for instance, the user's current stock holdings on "Etrade." Access of this data will require the data collection module 360 to log into the web site in a secure manner, navigate several pages and then reaching the desired data. Configuration of this type of access may be done by automatically determining the page of interest, by having the user manually specify the steps to follow or by having a third party provide a configuration file specific to, for example, "Etrade".

The display module 300 takes summarized data and displays the summarized data as a web page in a user-configurable format. This page may be automatically refreshed whenever a change occurs, or may be manually refreshed. The resulting display is similar in appearance to a commercial "start page."

The display module 300 is configurable to show more or less detail of certain pages. For example, the user may wish to see all new content from one page, the previous day's new content from a second page, the 5 newest items from a third page, and an indication whenever there are any changes on a set of specified pages. The display module 300 may track user accesses to items and remove items from the display when the user views them, so the user will only see items that are new and not previously viewed.

In one embodiment of the present invention, the display module 300 may be implemented as a component that plugs into an existing browser, a standalone user interface or a proxy that sits between the browser and the network.

The monitoring module 320 tracks the user's access to web pages. In one embodiment, the monitor module 320 notifies the display module 300 to delete an item from display when a user accesses an item that is summarized. In another embodiment, the monitor module 320 notifies the display module 300 of the priority of items being accessed by the user if the user does not access an item for a long period of time. Items that have not been accessed for a long time are categorized as a low priority by the monitor module 320.

In one embodiment of the present invention, the monitor module 320 determines whether the user is interested in a particular category of prioritized items designated for display. The monitor module 320 also includes logic to give the user an option to add frequently accessed pages to a list of pages that are tracked by the data collection module 360. The monitor module 320 further observes how pages are accessed by the user in order to enable the data collection module 360 provide the necessary information (e.g., the Etrade account login described above).

Still referring to FIG. 3, the content interface module 380 takes a list of content providers (typically web locations and channel names) and periodically accesses their content. This content is typically provided in an XML format and transmitted to the display module 300. The content interface module 380 also performs user-specified filtering to limit what content gets displayed.

Configuration file module 330 couples to the data collection module 360 to keep track of user configuration files (FIG. 4A) of preferred user web sites. In one embodiment of the present invention, data for the configuration file module 330 is provided to the display module 300 to display content from user configured web sites. Data from the configuration file module 330 may also be provided to the configuration modifier module 310 to allow the user to modify the search path of the data collection module 360. Additionally, data from the configuration file module 330 is provided to the content interface module 380 for identifying specified content providers from which the data collection module 360 may extract content.

Similarly, the summary file module 370 stores summary pages of updated content from the user specified web sites that the data collection module 360 accesses. The summary pages stored in the summary file module 370 are collated with the contents of the history file module 340 to determine which summarized updated pages have been accessed by the user. The history file module 340 stores data from user requests and keeps track of the content already accessed by the user. In one embodiment of the present invention, the history file module 340 eliminates pages and content already accessed by the user from the monitor module 320.

The compare engine 350 is coupled to the data collection module 360 to compare content currently retrieved from the monitored web sites by the data collection module 360 with the last retrieved content from these web sites to determine whether there has been a change in the content. The compare engine 350 uses information from the summary file module 370 of the last retrieved content from a particular web site and compares incoming content from the same web site with the previous content. In one embodiment of the present invention, the compare engine 350 may use time stamps retrieved from the web sites as indicators for updated content. In another embodiment, the compare engine may use a checksum of the last content retrieved from a particular web site to compare with the updated content to determine whether to update the summary page module 370.

Figure 4A:
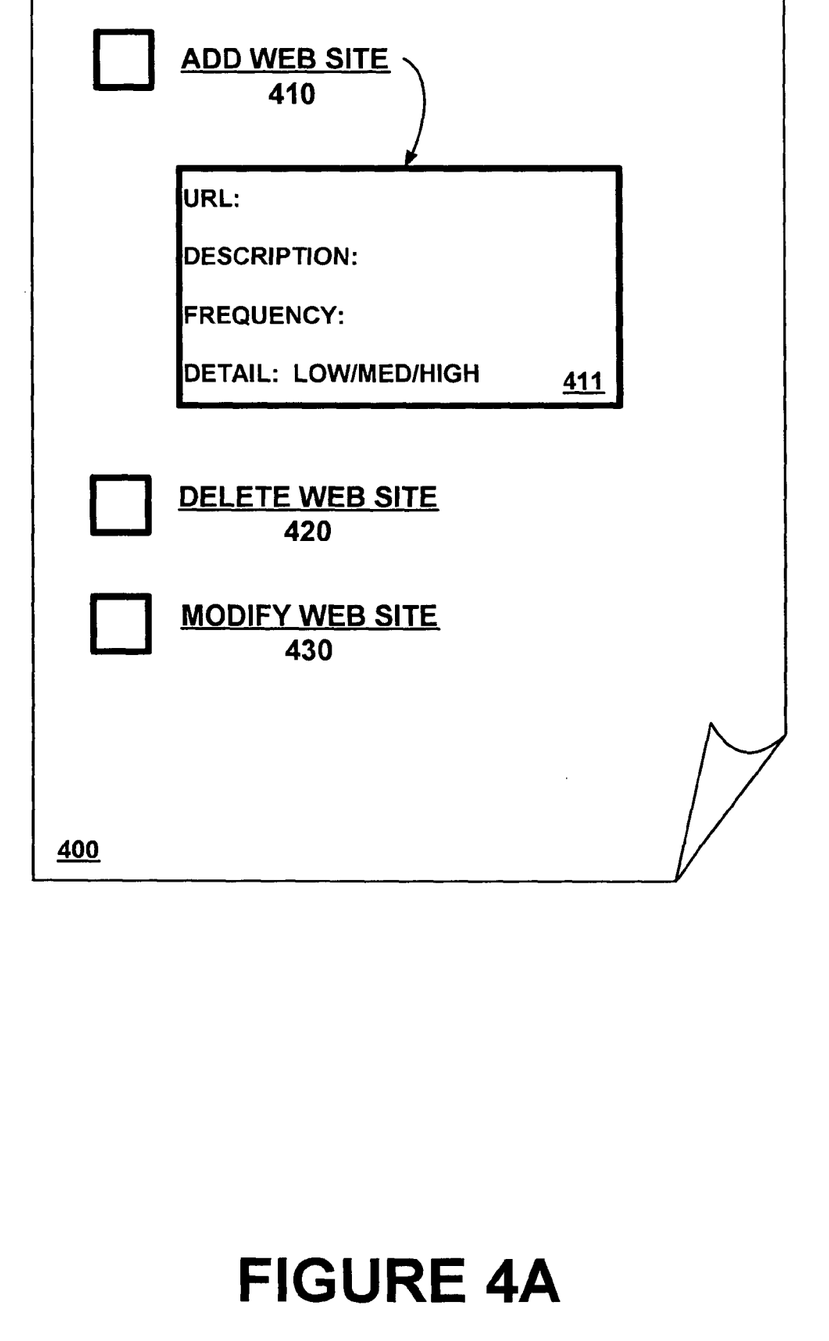
FIG. 4A is an exemplary depiction of one embodiment of the configuration page of the present invention.

FIG. 4A is an exemplary depiction of one embodiment of the configuration page of the present invention as may be displayed on a computer screen. As shown in FIG. 4A, the configuration page 400 comprises add web site button 410, delete web site button 420 and modify web site button 430.

In one embodiment of the present invention, the user can click on any one of buttons 410-430 to access a new page menu 411 in order to add, delete or modify a search request to the data collection module 360. In the example illustrated in FIG. 4A, when a user clicks on the add web site button 410, the drop down menu 411 is invoked. The new page menu 411 gives the user a list of options that the user may make entries to determine the web sites the user wishes to track. The new page menu 411 typically allows the user to enter the URL of the web site(s) to be track, the frequency at which content must be retrieved from the selected web site, a description of desired content and a priority at which the content must be displayed.

To delete a previously selected web site, the user clicks on delete web site button 420 and deletes the URL information from the new page menu 411. Similarly, to modify a web search, the user clicks on the modify web site button 430 and modifies the desired URL from the new page menu 411. User entries into the configuration file 400 are automatically updated in the configuration file module 340 and provided to the data collection module 360.

In one embodiment of the present invention, the data collection module 360 reconciles the user configured update frequency with the real-time updates of selected web sites. This typically occurs when content updates in some user selected web sites are either more frequently or less frequently updated that is specified in the configuration file 400. Since the data collection module 360 has real-time information of the user specified web sites, the data collection module 360 can automatically modify the user configured frequency entry in the configuration file 400 in order to either reduce or increase the frequency at which the user may look-up updated content from the selected web sites.

Figure 4B:
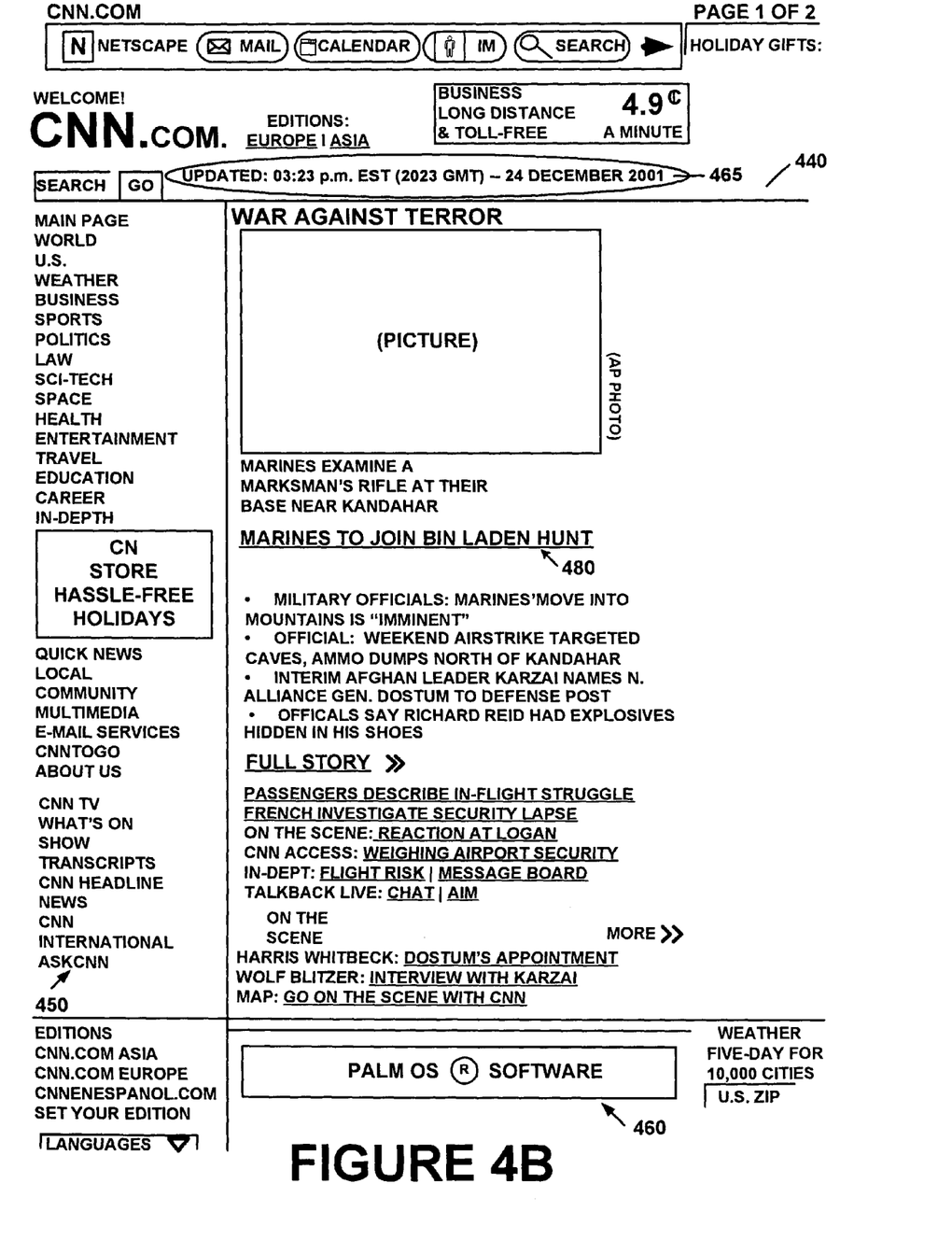
FIG. 4B is an exemplary depiction of an embodiment of an updated content page of the present invention.

FIG. 4B is an exemplary web page that may be gathered by the data collection module 360 of one embodiment of the present invention. Information contained in the web page 460 is consolidated and provided to the summary module 370 to format the information in a manner suitable for delivery to the user. In the exemplary depiction in FIG. 4B, the summary module 370 strips the banner information 440, the menu information 450 and the time stamp information 465 and only present the text information contained in text 480 and 470. In one embodiment of the present invention, each of the entries in text 480 and 470 may be color coded by the user to highlight the news items that user wishes to see. In one embodiment, the present invention may be configured to select a subset of links, such as the first link in each section of text 480 and 470.

Figure 5:
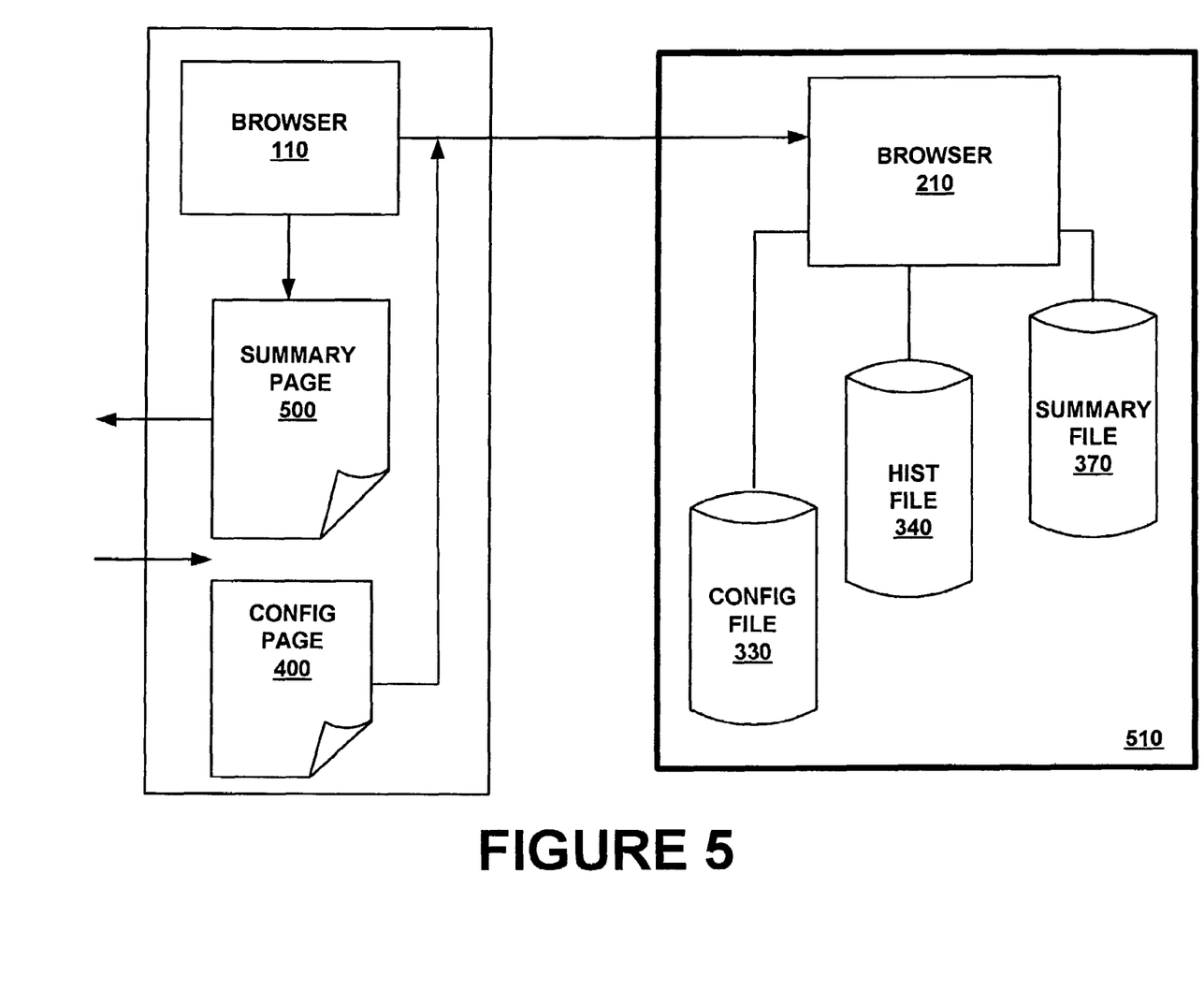
FIG. 5 is a block diagram of an embodiment of an alternative configuration of the browsing environment of the present invention.

FIG. 5 is a block diagram depiction of an embodiment of the present invention. As was described in FIG. 2, the present invention may be implemented as a proxy to a commercial off-the-shelf browser in the same computer system. Alternatively, as shown in FIG. 5, the present invention may be implemented as a separate web site running on a computer separate from the computer and browser to which the user is connected. In this embodiment, the user connects to the browser 110 and accesses the web site 510 containing browser 210. With the exception of having the summary page 520 and configuration page 400 stored on the user's computer 100, browser 210 is similarly configured and functions as the browser 210 in FIG. 2.

Figure 6:
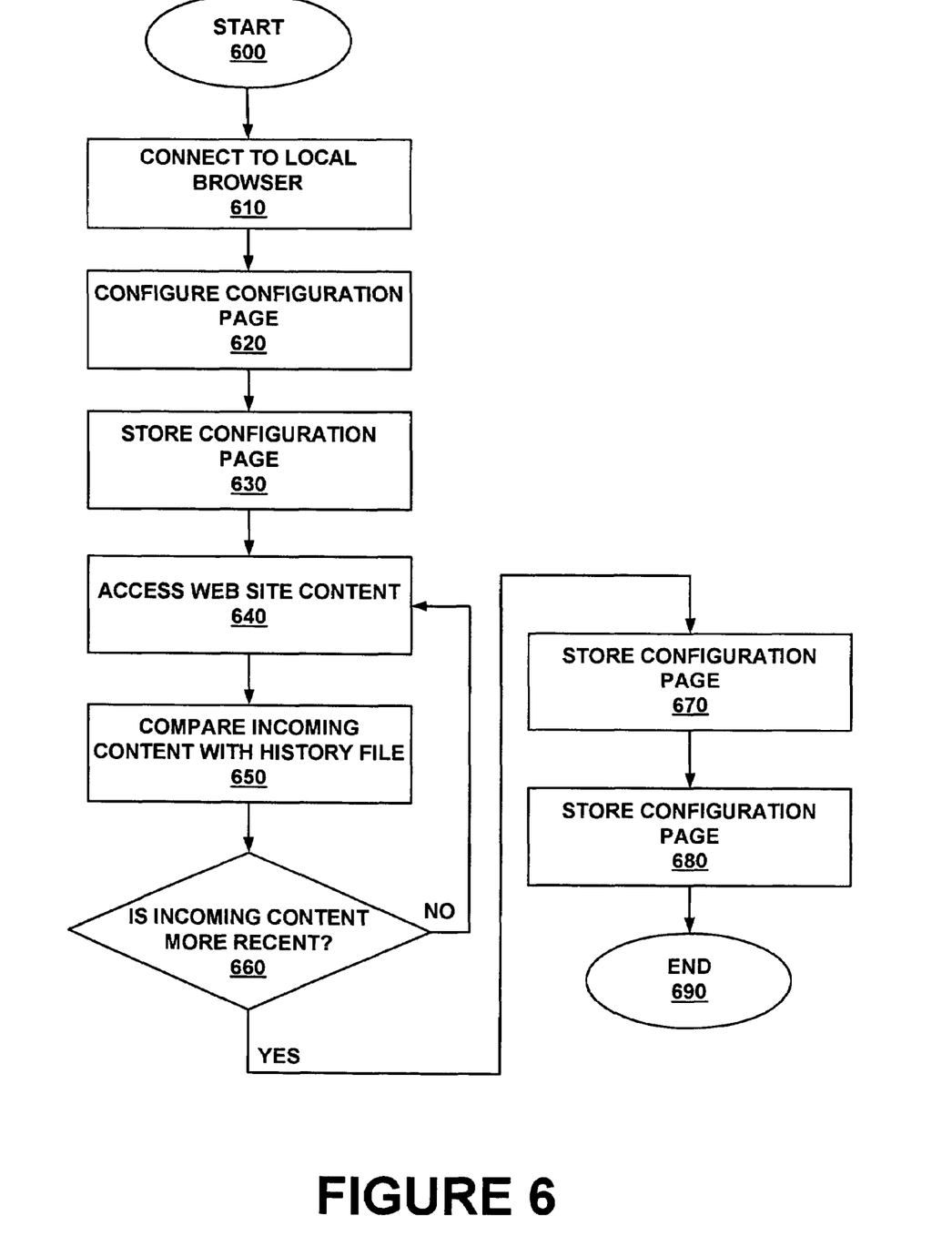
FIG. 6 is an exemplary flow diagram depiction of the selection, availability and presentation of content processes in an embodiment of the present invention.

Reference is now made to FIG. 6 which is a flow diagram of the operation of one embodiment of the present invention. FIG. 6 illustrates a computer implemented process. The content retrieval process of one embodiment of the present invention is initiated at 600 when the user connects 610 to a local browser. At step 620, the user configures a configuration page to specify the web sites and associated content that the user wishes to track. The user is also able to configure the configuration page to indicate the frequency at which the user wishes content from the specified web sites to be updated.

At step 630, the user configured configuration page is stored in the configuration file module 330. The stored configuration page is accessible by the data collection module 360. At step 640, the data collection module 360 accesses the web sites specified in the configuration page to retrieve content the user wishes to see. At step 650, the data collection module 360 uses the compare engine 350 to compare any new incoming content from its latest search with the last content retrieved from the specified web sites to determine if there has been any change in the content. In one embodiment of the present invention, the data collection module 360 uses timestamp changes in the incoming content with that stored in the last summary page to determine if any updates have occurred to the content retrieved.

If the latest content retrieved by the data collection module 360 is more recent 660, the content is summarized 670 and displayed 680 to the user. If, on the other hand, the latest retrieved content is the same as the last previous content retrieved, processing loops back to step 640.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications that are suited to the particular use contemplated. It is intended that the scope of the invention be defined by the Claims appended hereto and their equivalents.

The invention claimed is:

1. A computer system comprising:
   a first web browser for browsing web sites on the Internet;
   a second web proxy coupled to said first web browser for periodically automatically examining a plurality of web sites to retrieve a plurality of updated content of user defined content from each of said plurality of web sites, wherein said second web proxy examines said plurality of web sites at a user defined frequency that is specified by a user;
   a data formatting module for automatically formatting said updated content retrieved from said plurality of web sites in a format suitable for rendering to said user on said first web browser; and
   a content retrieval frequency reconciliation module for reconciling the frequency at which said plurality of web sites update said user defined content with said user defined frequency.

2. The computer system of claim 1, further comprising an automatic content detection module coupled to said second web proxy for automatically determining whether content selected by said user has been updated from a previous examination of said plurality of web sites by said second web proxy.

3. The computer system of claim 2, further comprising a data filtering module coupled to said automatic content detection module to automatically filter out unimportant data from said updated content.

4. The computer system of claim 3, wherein said user provides a web search request to determine the type of content to be delivered from said plurality of web sites to said user.

5. The computer system of claim 4, wherein said updated content from said plurality of web sites is simultaneously delivered to said user.

6. The computer system of claim 1, wherein said second web proxy further comprises a user configurable configuration page for allowing said user to specify the content of a search request to said plurality of web sites.

7. A user defined applications content selection and retrieval browser system, comprising:
   a data collection module for automatically searching a plurality of user defined web sites to detect and retrieve content updates, wherein said data collection module searches said plurality of user defined web sites for content updates at a user defined frequency that is specified by a user;
   a content display module for displaying to said user said content updates in a user configurable format;
   a content summary module for formatting said content updates in said user configurable format;
   a content configuration module for maintaining a configuration file to enable said user to define desired web content and the user defined frequency; and
   a content retrieval frequency reconciliation module for reconciling the frequency at which said plurality of web sites update said user defined content with said user defined frequency.

8. The browser system of claim 7, further comprising a content monitor module coupled to said data collection module for tracking said user's access to said web content defined in said configuration file.

9. The browser system of claim 7, further comprising a content interface module for providing a list of content providers on the Internet and periodically accessing said content providers to retrieve content for presentation to said user.

10. The browser system of claim 7, further comprises a content summary module for formatting said updated content retrieved from said plurality of user defined web sites and presenting said formatted content to said user.

11. The browser system of claim 8, further comprising a content history module coupled to said data collection module to determine whether said updated content retrieved by said data collection module has been accessed by said user.

12. The browser system of claim 11, wherein said data collection module also automatically determines whether content selected by said user has been updated from a previous check of said plurality of user defined web sites.

13. A web browser comprising:
   a web content provider service for providing a user with web site content from a plurality of web sites in a user defined fashion based on selectedness, presentability and updatability for each respective web site; and
   configuration service logic for storing user configuration information for said user defining content access requirements of said user for each of said plurality of web sites, wherein said user configuration information comprises a user defined frequency at which said web content provider is to search said plurality of web sites for updated content; and
   a content retrieval frequency logic for reconciling said user defined frequency with the frequency at which said plurality of web sites update their content.

14. The web browser of claim 13, wherein said web content provider comprises a plurality of content provider logic for simultaneously presenting content retrieved from said plurality of web sites in suitably formatted formats to said user.

15. The web browser of claim 14, wherein said web content provider further comprises detection logic for automatically detecting when content at said plurality of web sites have been updated.

16. The web browser of claim 15, wherein said content provider service further comprises a content presentation service for formatting and presenting to said user said updated content suitable for display in a user defined manner to said user.

17. The web browser of claim 16, wherein said content provider comprises logic to automatically compare and detect updated content retrieved from said plurality of web sites from content previously retrieved from said plurality of web sites.

18. The web browser of claim 13, wherein said content provider further comprises content delivery notification logic for highlighting to said user updated content retrieved from said plurality of web sites.

19. A method of browsing a plurality of web sites to retrieve updated user defined content for delivery to said user; comprising:
- defining a search request to retrieve said updated content from said plurality of web sites;
- defining a user defined frequency at which said search request is to be used to access said plurality of web sites to find said updated content;
- detecting changes in said updated content in said plurality of web sites from a previous search of said plurality of web sites;
- simultaneously filtering said updated content from said plurality of web sites to delete information prior to delivery to said user;
- formatting said retrieved updated content in a format suitable for delivery to said user; and
- reconciling said user defined frequency with the frequency at which said plurality of web sites update their content.

20. The method of claim 19, wherein said retrieved updated content from said plurality of web sites is simultaneously delivered to said user.

* * * * *